(12) United States Patent
El-Wardany et al.

(10) Patent No.: US 8,000,942 B2
(45) Date of Patent: Aug. 16, 2011

(54) BROACH TOOL DESIGN METHODOLOGY AND SYSTEMS

(75) Inventors: Tahany Ibrahim El-Wardany, Bloomfield, CT (US); Shaoluo L. Butler, Manchester, CT (US); Barclay Bingham Young, Jr., Chester, CT (US); Agnieszka M. Wusatowska-Samek, Mansfield Ctr., CT (US); James D. Campbell, Jr., East Hampton, CT (US); Jason Elliott, Willington, CT (US); Adam Cade Wilcox, Provo, UT (US); Ryan Clifford Cox, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 632 days.

(21) Appl. No.: 12/120,319

(22) Filed: May 14, 2008

(65) Prior Publication Data

US 2009/0287458 A1 Nov. 19, 2009

(51) Int. Cl.
*G06F 7/50* (2006.01)
*G06G 7/48* (2006.01)
(52) U.S. Cl. .............................. 703/1; 703/7
(58) Field of Classification Search .................. 703/1, 7
See application file for complete search history.

(56) References Cited

U.S. PATENT DOCUMENTS

| | | | |
|---|---|---|---|
| 4,243,347 A | 1/1981 | Clapp et al. | |
| 4,260,331 A | 4/1981 | Goodwin | |
| 4,767,274 A | 8/1988 | Walter | |
| 4,824,328 A | 4/1989 | Pisz et al. | |
| 4,841,820 A | 6/1989 | Kaminski et al. | |
| 5,135,339 A | 8/1992 | Kelm et al. | |
| 5,628,589 A | 5/1997 | Peuterbaugh | |
| 5,688,108 A | 11/1997 | Dierksmeier et al. | |
| 5,741,119 A | 4/1998 | Heppenstall | |
| 5,836,742 A | 11/1998 | Dierksmeier et al. | |
| 5,863,183 A | 1/1999 | Dierksmeier et al. | |
| 6,302,651 B1 | 10/2001 | Kildea et al. | |
| 6,371,468 B1 | 4/2002 | Lessard et al. | |
| 6,558,086 B1 | 5/2003 | Rigotti et al. | |
| 6,767,168 B2 | 7/2004 | Miller | |
| 7,156,621 B2 | 1/2007 | Stone | |
| 2002/0025232 A1 | 2/2002 | Miller | |
| 2003/0223831 A1* | 12/2003 | Viens et al. | 408/60 |
| 2005/0175462 A1 | 8/2005 | Lagrange et al. | |
| 2005/0267623 A1* | 12/2005 | Fang et al. | 700/160 |
| 2008/0230971 A1* | 9/2008 | Farooqui | 269/104 |

OTHER PUBLICATIONS

Ozturk et al, Modeling of Broaching Process for Improved Tool Design, ASME Conf. Proc. 2003, 291 (2003).*
Kokturk et al., Optimization of broaching tool design, 2004, Sabanci University, Istanbul, Turkey.*
Sutherland et al, A model for the cutting force system in the gear broaching process, International Journal of Machine Tools and Manufacture, vol. 37, Issue 10, Oct. 1997, pp. 1409-1421.*

* cited by examiner

*Primary Examiner* — Paul L Rodriguez
*Assistant Examiner* — Aniss Chad
(74) *Attorney, Agent, or Firm* — Carlson, Gaskey & Olds PC

(57) ABSTRACT

This disclosure relates to a design methodology used in manufacturing a broaching tool for cutting slots in aerospace disk applications. The method includes modeling geometry of the slot and the broach tool, which is based upon an initial minimum tooth rise that is determined empirically for the particular disk material. The number of broach inserts and teeth per insert is calculated, and the broach inserts are modeled. The stresses and deformation of the lug are calculated in a finite elements environment based upon simulated incremental broach tool movements. If the lug is not within specifications based upon design constraints, then the broach tool is revised and the simulations are repeated until the slot is within the desired specifications.

15 Claims, 5 Drawing Sheets

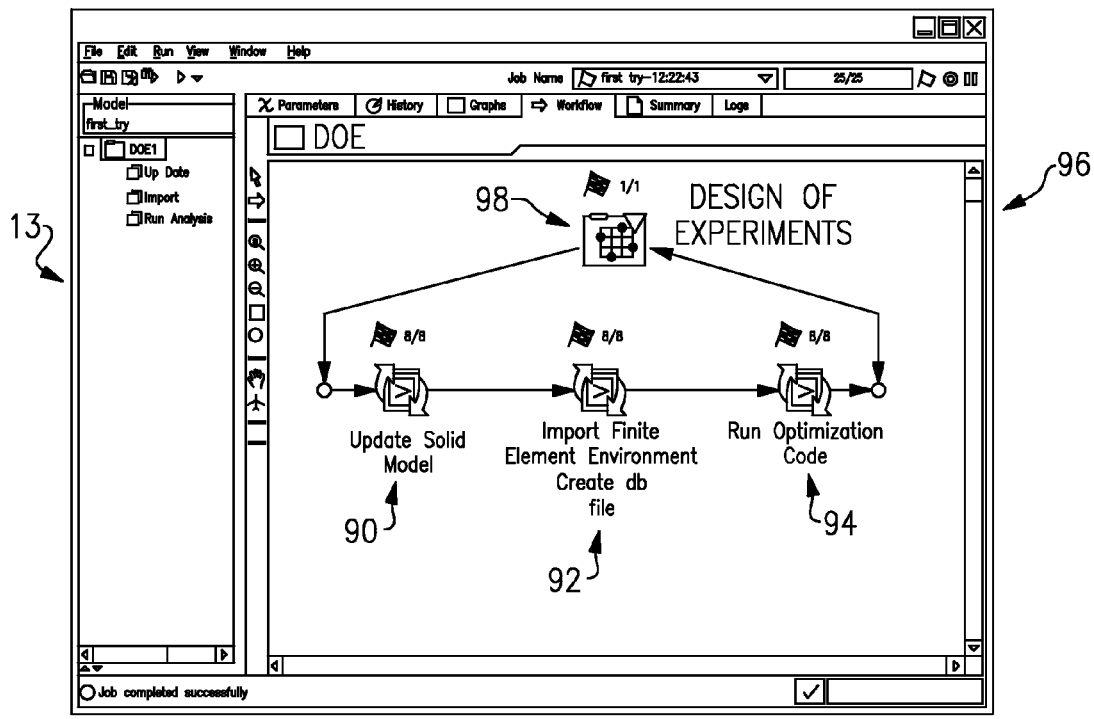
FIG.9
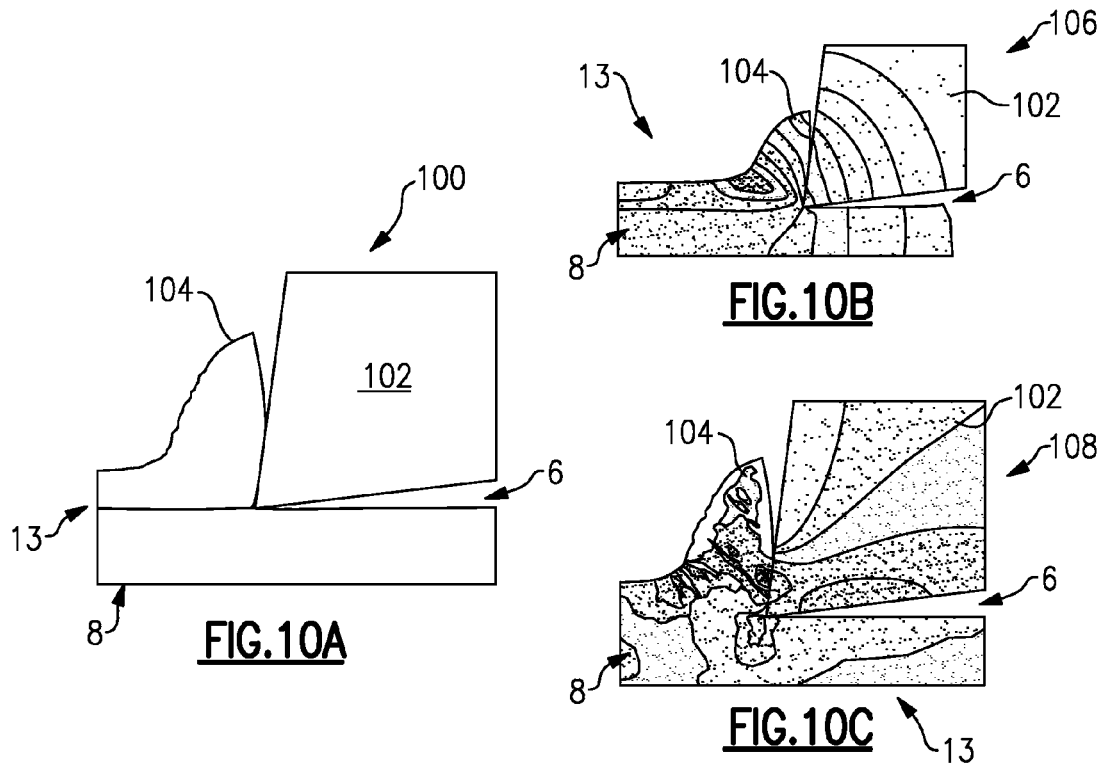
FIG.10A
FIG.10B
FIG.10C

BROACH TOOL DESIGN METHODOLOGY AND SYSTEMS

BACKGROUND

This disclosure relates to a methodology and systems for designing a broach tool used to machine components such as rotating disks used in aerospace applications.

A gas turbine engine integrates a compressor and a turbine having components that rotate at high speeds, which subject the components to significant centrifugal loading during operations. One component that rotates at high speeds is a disk that carries multiple circumferentially arranged blades. The blades are commonly attached at an outer circumference of the disk through respective blade attachment slots. Each of the slots has a profile that corresponds with the root of the blade, and has a configuration designed to retain the blade in the slot during operation. The blade attachments slots are generally of a "fir-tree" configuration to increase the load bearing surface area of the disk. Broaching is a technique often utilized for forming fir-tree slots in gas turbine engine disks.

In at least some known broaching processes, a broach tool includes a series of cutting teeth formed on a single solid bar or insert. The inserts and teeth are pulled through a workpiece to gradually remove material and form the desired slot opening. Each cutting tooth is typically slightly different from the adjacent cutting teeth. The fir-tree slots are generally formed in a three-stage broaching operation. Each stage may employ a broach tool including a set of up to thirty or more inserts. A rough shape of the slot is generally formed during an initial rough broaching stage. An intermediate broaching stage is used to form the intermediate shape of the slot. Finally, a finishing broaching stage is generally used to form the profile of the fir-tree slot.

Several known design approaches have disclosed fir-treel-broach slot configurations and details of the geometric assimilation of lines, arcs, and angles for the purposes of reducing centrifugal forces, bending moments, and vibrations and the consequential peak stresses that result at the attachment points. However, the limitations of such known broaching processes that are associated with aerospace materials include excessive material strain hardening, surface microstructure alteration (such as white etched layer and bend microstructures), slot deformation, and ripple formation on the slot surfaces. The ripples and defects on the slot surfaces may lead to a decreased disk life because of fretting between the blade root and the disk surface during engine operation. In addition to the high cost of the broach tools and limited tool life, the design of known broach tools is based on tribunal knowledge of other materials. These known design methods result in high scrap rate and lower tool life because of the surface anomalies generated during finishing of the slot. Such part scrap rate is generally higher compared to other machining processes due to a compromised surface integrity if the broach tool is not designed properly to account for the progress of strain hardening during machining.

What is needed is an approach and system for designing broach tools that facilitate reducing the undesirable effects of known broach design methods and systems.

SUMMARY

This disclosure relates to a design methodology used in manufacturing a broaching tool for cutting slots in aerospace disk applications. The method includes modeling geometry of the slot and the broach tool, which is based upon an initial minimum tooth rise that is determined empirically for the particular disk material. The number of broach inserts and teeth per insert is calculated, and the broach inserts are modeled. The stresses and deformation of the lug are calculated in a finite elements environment based upon simulated incremental broach tool movements. If the lug is not within specifications based upon design constraints, then the broach tool is revised and the simulations are repeated until the slot is within the desired specifications.

These and other features of the disclosure can be best understood from the following specification and drawings, the following of which is a brief description.

BRIEF DESCRIPTION OF THE DRAWINGS

FIG. 9 is a schematic view illustrating the analysis and output of the example broach tool design methodology.

FIGS. 10A-10C schematically depict a 2D analysis of a finite element machining model illustrating material microstructure, cutting temperature and hydrostatic pressure, respectively.

DETAILED DESCRIPTION

Figure 1:
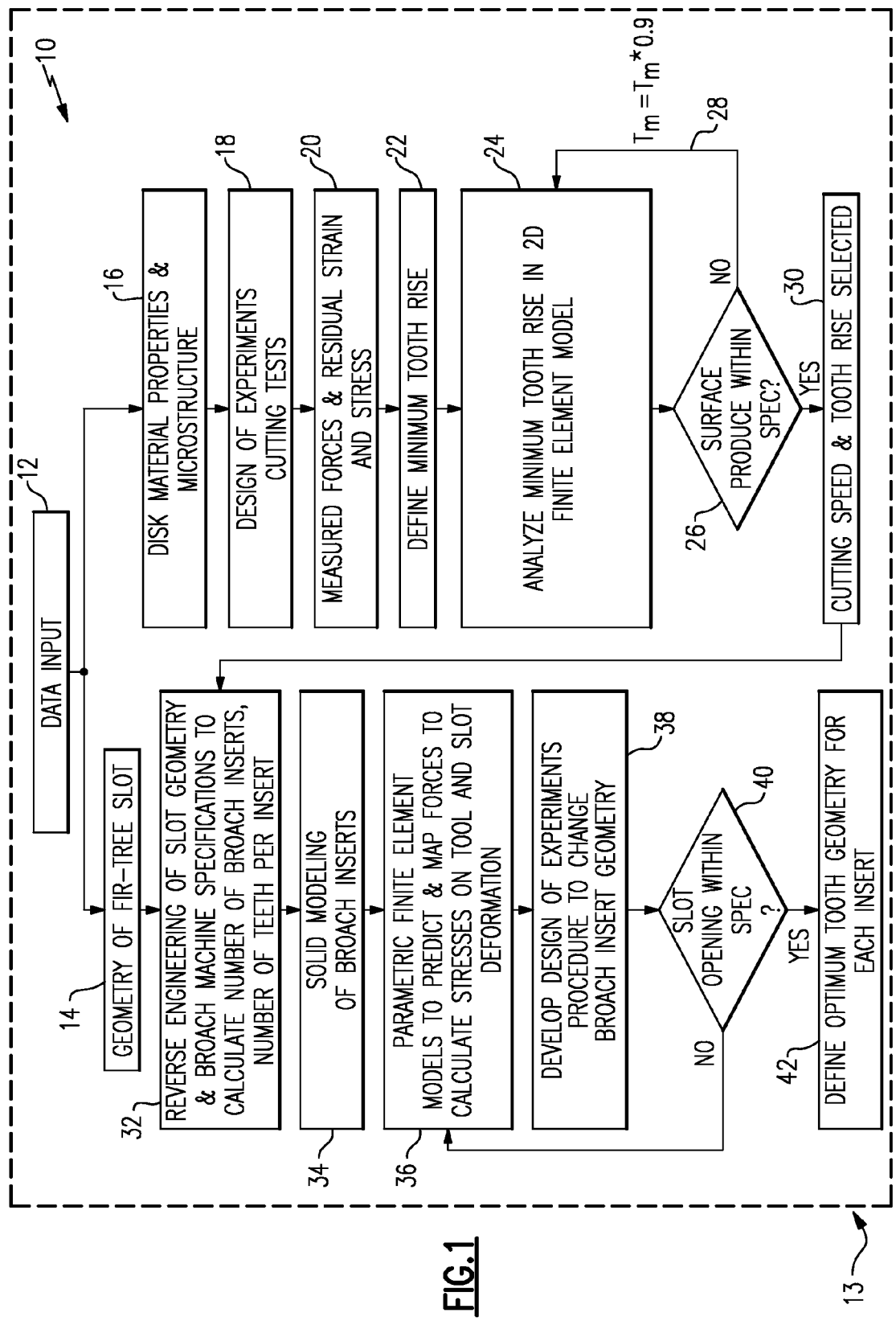
FIG. 1 is a flow chart depicting an example broach tool design methodology.
Figure 2:
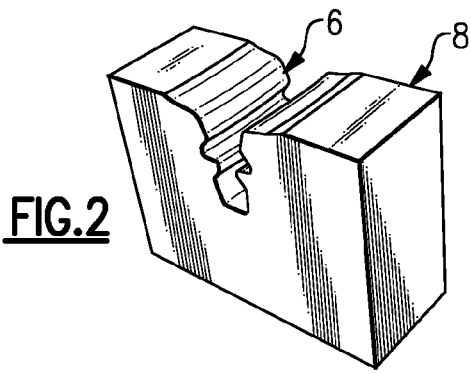
FIG. 2 is a schematic view of a fir-tree slot.

FIG. 1 illustrates an exemplary methodology 10 to design a broach tool for machining fir-tree slots 6 in titanium (Ti), steel, and nickel (Ni) based superalloys disks 8 (FIG. 2). The methodology 10, shown in FIG. 1, is performed using an exemplary computing system 13 configured to perform the method 10. The method 10 provides a systematic way to predict the number of broach inserts in a tool set and the number of teeth per insert based on the provided disk material properties and microstructure (block 16) and geometrical model of the disk fir-tree slot (block 14), corresponding to data input 12 provided by a user. It should be appreciated that each block represented in the figures are representative of a method step.

It should be noted that a computing system may be used to implement various functionality disclosed in this application. In terms of hardware architecture, such a computing system may include a processor, memory, and one or more input and/or output (I/O) device interface(s) that are communicatively coupled via a local interface. The local interface may include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing system 13, a semiconductor based microprocessor (in the form of a microchip or chip set) or generally any device for executing software instructions.

The memory may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory may also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing system 13 is in operation, the processor may be configured to execute software stored within the memory, to communicate data to and from the memory, and to generally control operations of the computing device pursuant to the software. Software in memory, in whole or in part, is read by the processor, perhaps buffered within the processor, and then executed.

First, for each type of disk material and/or alloy, a design of experiments or a series of tests (block 18) are performed to identify the minimum tooth rise in a finishing broaching stage before designing the tool. The exact rise may vary depending on the material microstructure. For example, orthogonal cutting test may be performed on a lathe machine to identify the microstructure strained zone using optical microscopy or x-rays diffraction method. The orthogonal cutting tests are performed under different feed rates (chip thicknesses), speeds and make angles. Cutting forces, and residual stress and strain are measured, as indicated at block 20. The cutting force data identifies the effect of increasing feed rate or chip thickness on a total broaching load in the finishing stage.

For example, the measured forces in broaching of coarse-grained (average grain size of 55 μm) nickel based superalloy under different chip thickness representing the cutting forces do not increase significantly as the tooth rise (chip thickness) increases. One exemplary test indicated that an increase in the chip thickness from 12 μm to 50 μm increases the forces only by 14%. These results suggests that a tooth rise of 55 μm may be used to define a minimum tooth rise (block 22) when designing the broach tool for the finishing stage of the tested alloy.

Next, the residual stresses and strains, forces, and microstructure evolution at various cutting speeds is analyzed in a two-dimensional (2D) finite element model for defined minimum tooth rise (block 24). For example, DEFORM or ABAQUS finite element program may be used for the 2D analysis to determine the residual strain and stresses induced on a machined surface of a material/alloy and used for further identifying of the optimum tooth rise in the finishing stage. For example, one test determined that the depth of microstructure evolution under the machined surface is higher at lower chip thickness of 12.7 μm than that at higher chip thicknesses of 39 and 50 μm. At the chip thickness of 12.7 μm, the microstructure on the machined surface was strained and altered to a depth of 24 μm. The diffraction pattern of the same material indicated that the microstructure retains its original pattern after a depth of 32 μm beneath the machined surface. It should be appreciated that other suitable software programs may be used for the 2D finite element analysis.

Experimental data indicates that the minimum chip thickness for the broaching process in a finishing pass of the finishing stage should be higher than the depth of strained layer beneath the produced surface. In a coarse-grained material, the strained layer may be confined within the thickness of one to two average grain sizes of a workpiece material. If a finishing pass is performed through the strained layer, then changes in the deformation mode may cause shear banding deformation that result in localized changes in the strain rates as well as adiabatic heating. Such deformation inhomogeneities in turn may cause the formation of distorted layers such as white etching layers in Ni-based superalloys and steels or alpha-cases in Ti-based alloys.

The above 2D analyses of the residual stresses and strains, forces, and microstructure evolution at various cutting speeds is conducted iteratively (block 28) to converge on a minimum tooth rise, Tm, and cutting speed that is within desired specifications (block 26). The desired specifications are defined by a broach tool designer, for example.

If within the desired specification as determined, for example, by a slot designer, then the tooth rise and cutting speed are selected (block 30) for application to a reverse engineering method (block 32) that defines the required number of broach inserts for the three stages based on the designed fir-tree slot geometry (block 14) within the tolerance and accuracy specified. A series of numerical simulations to model the broaching process may be specified to identify cutting speeds, and a multitude of broach insert parameters (e.g., rise per tooth, face/hook angle, and back-off angle, back angle tooth pitch, tooth thickness and tooth form (i.e., sketch), based on the values of hydrostatic pressure predicted for the specified disk material.

Figure 3:
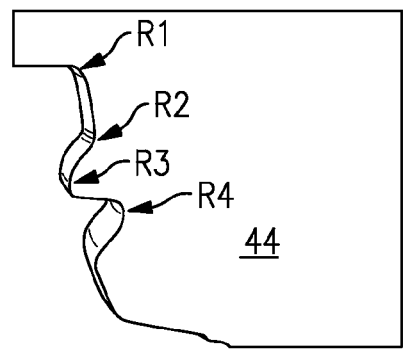
FIG. 3 is a schematic view of a tool sketch output from a CAD model.
Figure 4:
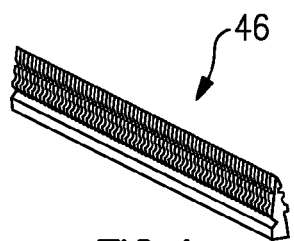
FIG. 4 is a perspective view of an example finish insert from a solid model.
Figure 5:
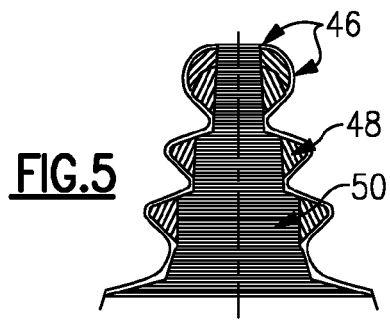
FIG. 5 is a plan view of example rough, semi-finish and finish inserts from the solid model.
Figure 6A:
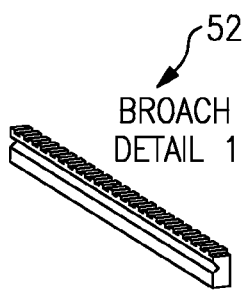
FIGS. 6A-6C are perspective views of different rough broach inserts having different tooth rises generated by the solid model.
Figure 6B:
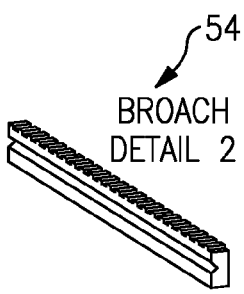
Figure 6C:
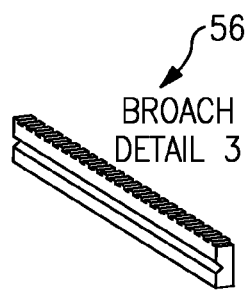

Sets of rules are used to generate solid models for each broach insert, based upon data from the broach tool designer, in solid modeling environment such as, but not limited, the UNIGRAPHIC CAD environment (UG) (block 34). It should be appreciated that other suitable software programs may be used for solid modeling. The example solid model of fir-tree slot 6 in the disk 8 (shown in FIG. 2) is imported into UG, and a finish insert is sketched having radii R1-R4, as shown at 44 in FIG. 3. A finish insert solid model 46 is created in UG from the sketch 44, as shown in FIG. 4, using an expressions list to update the number of teeth and pitch. In a similar manner, solids models are created for semi-finish inserts 48 and rough inserts 50 shown in FIG. 5. Three example rough inserts 52, 54, 56 having progressively larger tooth rises are shown respectively in FIGS. 6*a*-6*c*.

The solid models of the different broach inserts are then input to a finite element model such as, but not limited to, ANSYS finite element code to predict and map cutting forces, and then determine tool and lug deformation (block 36, FIG. 1). The lugs are the portions of the disk that provide the slots. Lug deformation corresponds to slot deformation. It should be appreciated that other suitable software programs may be used for finite element modeling. The deformation of the disk is utilized in predicting instantaneous chip thickness and variation of the cutting forces and stresses on the tool and workpiece to prevent tool chipping and/or breakage. With continuing reference to FIG. 1, a procedure is devised to modify the broach insert geometry based upon the finite element analysis results (block 38). If the slot opening is within the desired specification (block 40) as determined by customary design practice, then the desired tooth geometry for the insert has been achieved and is defined as the optimum tooth geometry for the insert (block 42). If the slot opening is outside the desired specification, then the finite element model is revised and the forces, stresses and slot deformation are reanalyzed (block 36).

Figure 8:
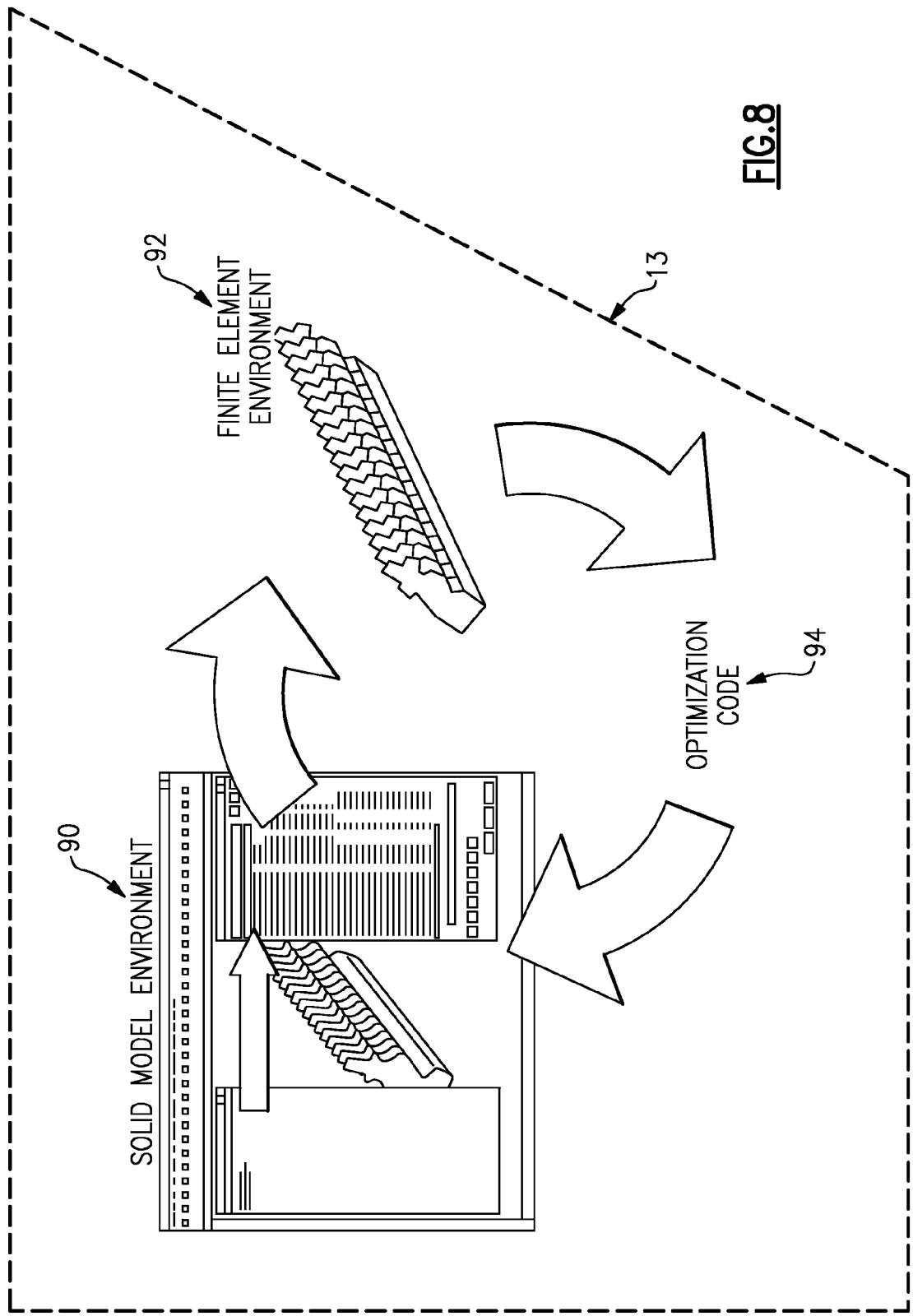
FIG. 8 is a schematic view of the iterative routine illustrated more generally.

The overall iteration approach used in the methodology 10 is schematically illustrated in FIGS. 8 and 10. Solid modeling (UG) data 90 is read by the finite element environment (ANSYS) 92. Data from the finite element environment 92 is optimized using optimization code (FIPER) 94. The optimization results may be used to refine the broach tool corresponding to the solid modeling data 90. The methodology 10 achieves the broach insert design by changing the broach insert parameters including the pitch, and distribute tooth form to facilitate reducing slot deformation.

Figure 7:
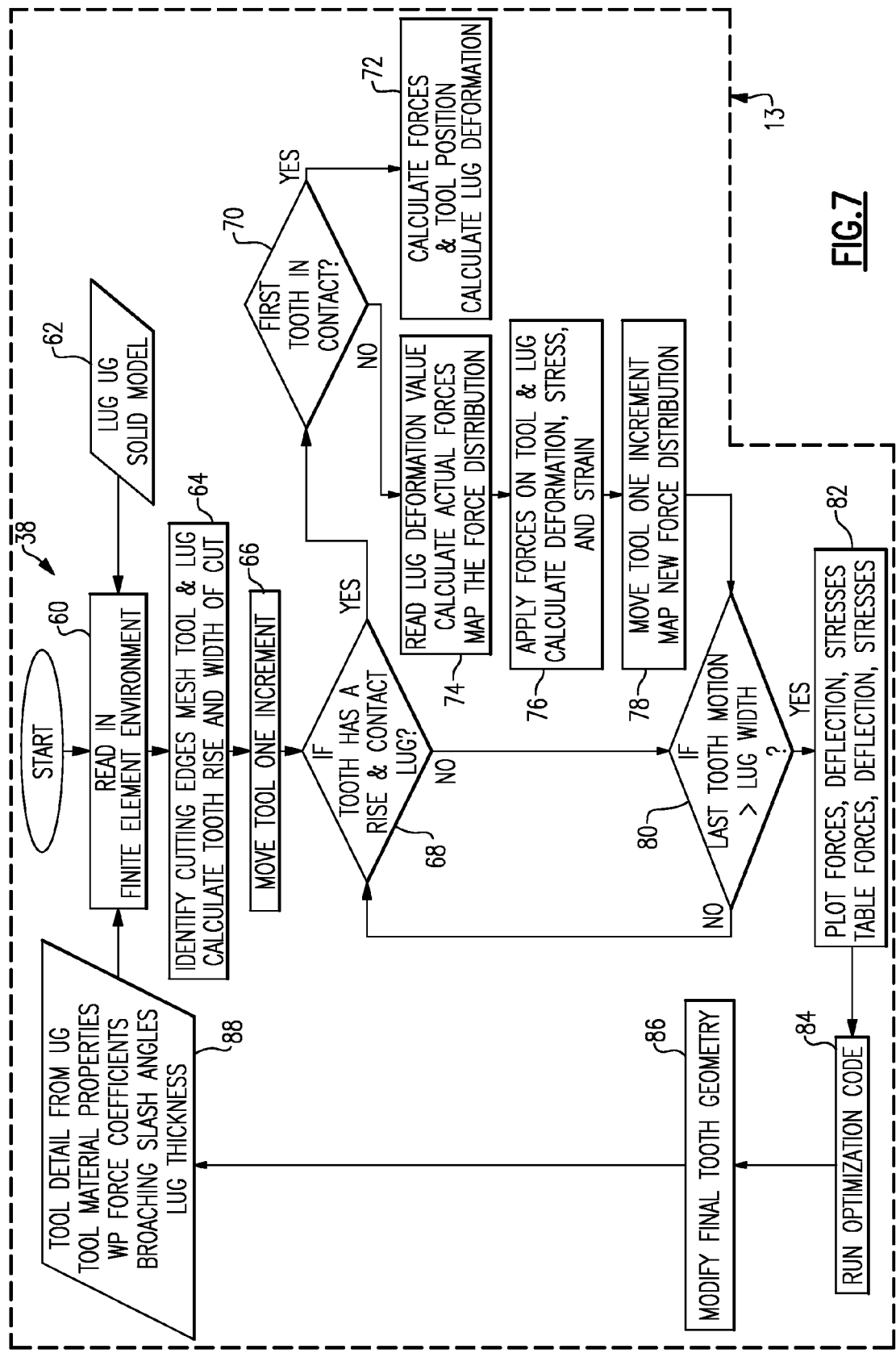
FIG. 7 is a flow chart depicting an iterative routine for converging on a desired broach insert design.

As shown in FIG. 7, an exemplary procedure for determining the desired broach insert geometry according to block 38 in FIG. 1 is illustrated. The solid models for the lug and tool (blocks 62, 64) are read by the ANSYS finite element environment (block 60). Information such as tool and workpiece material properties, workpiece (WP) force coefficients, broaching slash angles and lug thickness are also provided (block 88). The cutting edges are used to create the finite element model, and tooth rise and the width of cut are determined (block 64). One incremental movement of the tool is simulated (block 66). If the tool does not have a rise and contacts, then the procedure jumps to block 80 as discussed below. If the tool has a rise and contacts the lug (block 68), then it is determined whether the first tooth is in contact with the lug (block 70). If the tooth rise is too small, for example, the tool will rub on the lug and generate heat that will distort the grain structure of the lug. If the first tooth of the broach insert is determined to be in contact with the lug, the forces, tool position and lug deformation are determined (block 72). If the first tooth of the broach insert is not in contact with the lug, then the lug deformation value is read by ANSYS (block 74). Then, the actual forces between the lug and tool are determined, and the force distribution is mapped. The forces from block 74 are applied to the tool and lug, and the deformation, stress and strain are determined (block 76). An additional incremental movement of the tool is then simulated and the new force distribution is mapped (block 78).

If the last tooth motion is greater than the lug width (block 80), then the forces, deflection and stresses are plotted and arranged in a table (block 82). These values are then run through an optimization code (block 84 in FIG. 7, at 94 in FIG. 8), such as FIPER, as a check on the limits and design constraints. If the values are outside the limit, FIPER modifies the tooth geometry (block 86), which is provided to UG (block 88) for use by ANSYS (block 60) for reanalysis of the new broach insert geometry.

The results 98 obtained from the FIPER optimization approach (block 84) may be in the format presented generally at 96 in FIG. 9. Simulation results will identify the optimum tooth rise and allowable curvature that reduce stress concentration.

To finalize the broach tool design, a 2D finite element machining model is created to define the optimum tool edge preparation and cutting edge honing radius that facilitates reducing surface anomalies. An example of 2D finite element machining model is presented in FIGS. 10A-10C, which illustrate a tool 102 removing a chip 104 from the lug 8 at the slot 6. FIG. 10A represents a model 100 illustrating a prediction of microstructure deformation. FIG. 10B represents a model 106 illustrating a prediction of cutting temperature. FIG. 10C represents a model 108 illustrating a prediction of hydrostatic pressure. The models 100, 106, 108 act as a check on the results of the broach insert design methodology 10.

The edge preparation honed radius will be added to the tool design sheet. The tool solid model can then be fed to computer aided modeling (CAM) software to generate a computer numerically controlled (CNC) program for accurate grinding of the tooth geometry.

The solid model for the tool simplifies and automates the design process. The disclosed methodology also facilitates insuring quality, minimize the number of manufactured tool iterations, and reduce production time. The disclosed methodology generates broach tool design parameters that specify the value of the chip thickness or the rise per tooth for the finishing inserts based on the disk material behavior during broaching. The specified rise per tooth for the finishing inserts is customized to accommodate for material microstructure evolution during broaching. This value should exceed the average grain size of the workpiece. The disclosed methodology provides methods and systems for analysis of material microstructure to define chip thickness that facilitates reducing production of surface anomalies such as white etching layer cause by broaching. Test results indicate that the tooth rise for finishing and shaving passes are higher than the average grain size of the workpiece material for the coarse-grained alloys (average grain size larger than 25 µm) or higher than 32 µm for the fine-grained alloys (average grain size less than 25 µm). The disclosed methodology facilitates insuring that the tool engages with the lug and generates less strained material, which facilitates reducing the cutting force generated and consequently stress, strain and slot deflection.

Although example embodiments have been disclosed, a worker of ordinary skill in this art would recognize that certain modifications would come within the scope of the claims. For that reason, the following claims should be studied to determine their true scope and content.

What is claimed is:

1. A method for designing a broaching tool comprising the steps of:
 a) providing a geometry of a slot to be broached;
 b) providing a material dependent initial minimum tooth rise for a broach tool that includes multiple broach inserts,
  wherein the broach inserts include finish, semi-finish and rough broach inserts, and determining the initial minimum tooth rise for the finish broach inserts,
  wherein the initial minimum tooth rise is greater than 30 µm for a coarse-grained alloy material with an average grain size larger than 25 µm, and wherein the initial minimum tooth rise is greater than 32 µm for a fine-grained alloy material with an average grain size smaller than 25 µm;
c) calculating a number of broach inserts and teeth per insert based upon steps a) and b);
d) solid modeling the broach inserts from step c);
e) calculating the stresses on the broach tool and deformation of the slot;
f) determining whether the slot dimensions are within desired specifications based upon step e); and
g) revising the broach tool if the slot is outside the desired specifications, and performing steps c)-g) until the slot is within desired specifications; and
h) manufacturing a broaching tool with design characteristics of the broach tool resulting from performing step a)-g).

2. The method according to claim 1, wherein the geometry is a solid model of the slot and the broach inserts.

3. The method according to claim 2, wherein step a) is performed in a solid model environment.

4. The method according to claim 1, wherein step b) includes performing cutting tests to empirically determine microstructure strained zones at different feed rates for a material of the slot.

5. The method according to claim 3, wherein step d) is performed in the solid model environment.

6. The method according to claim 1, wherein step e) includes importing data from steps a) and d) into a finite element modeling environment.

7. The method according to claim 6, wherein step e) includes simulating an incremental movement of the broach tool to determine forces on the broach tool and the slot.

8. The method according to claim 7, wherein step e) includes calculating deformation, stress and strain in the slot and on a broach tool edge.

9. The method according to claim 8, wherein step e) includes simulating an additional incremental movement of the broach tool to determine new forces on the broach tool and the slot.

10. The method according to claim 9, wherein step e) includes outputting deflections and stresses in the slot.

11. The method according to claim 10, wherein steps f) and g) include receiving the outputs and reevaluating design constraints of the broach tool and modifying broach tool geometry based upon design parameters.

12. The method according to claim 11, wherein step includes modeling microstructure deformation at a cutting chip in the slot.

13. The method according to claim 11, wherein step f) includes modeling hydrostatic pressure at a cutting chip in the slot to define possible generation of undesired surface anomalies.

14. A method for designing a broaching tool comprising the steps of:
a) providing a geometry of a slot to be broached;
b) providing a material dependent initial minimum tooth rise for a broach tool that includes multiple broach inserts;
c) calculating a number of broach inserts and teeth per insert based upon steps a) and b);
d) solid modeling the broach inserts from step c);
e) calculating the stresses on the broach tool and deformation of the slot;
f) determining whether the slot dimensions are within desired specifications based upon step e), including modeling cutting temperature at a cutting chip in the slot;
g) revising the broach tool if the slot is outside the desired specifications, and performing steps c)-g) until the slot is within desired specifications; and
h) manufacturing a broaching tool with design characteristics of the broach tool resulting from performing step a)-g).

15. A system for designing a broaching tool comprising:
a processor configured to provide a geometry of a slot to be broached, to provide a material dependent initial minimum tooth rise for a broach tool that includes multiple broach inserts, to calculate a number of broach inserts and teeth per insert based upon the geometry and the material dependent initial tooth rise, to solid model the broach inserts from the calculated number of broach inserts and teeth per insert, to calculate the stresses on the broach tool and deformation of the slot, to determine whether the slot dimensions are within desired specifications based upon the calculated stresses and deformation;
wherein the processor is configured to revise the broach tool if the slot is outside the desired specifications, and calculate a number of broach inserts and teeth per insert, solid model the broach inserts from the calculated number of broach inserts and teeth per insert, calculate the stresses on the broach tool and deformation of the slot, determine whether the slot dimensions are within desired specifications based upon the calculated stresses and deformation, and revise the broach tool if the slot is outside the desired specifications until the slot is within the desired specifications; and
wherein the processor provides a check on the broach inserts by predicting at least one of a cutting temperature and a hydrostatic pressure at a cutting chip.

* * * * *